United States Patent [19]
Wu et al.

[11] Patent Number: 5,376,968
[45] Date of Patent: Dec. 27, 1994

[54] ADAPTIVE COMPRESSION OF DIGITAL VIDEO DATA USING DIFFERENT MODES SUCH AS PCM AND DPCM

[75] Inventors: Allen Wu; Edward A. Krause, both of San Diego; Woo H. Paik, Encinitas, all of Calif.

[73] Assignee: General Instrument Corporation, Hatboro, Pa.

[21] Appl. No.: 23,251

[22] Filed: Mar. 11, 1993

[51] Int. Cl.⁵ ............................................. H04N 7/137
[52] U.S. Cl. ..................... 348/413; 348/402
[58] Field of Search ............... 348/402, 410, 413, 416, 348/421, 400, 699; H04N 7/137

[56] References Cited
U.S. PATENT DOCUMENTS

| | | |
|---|---|---|
| 4,802,006 | 1/1989 | Iinuma et al. . |
| 4,816,906 | 3/1989 | Kummerfeldt et al. . |
| 4,827,340 | 5/1989 | Pirsch . |
| 4,897,720 | 1/1990 | Wu et al. . |
| 5,057,916 | 10/1991 | Krause et al. ..................... 348/416 |
| 5,068,724 | 11/1991 | Krause et al. . |
| 5,091,782 | 2/1992 | Krause et al. . |
| 5,235,419 | 8/1993 | Krause ............................. 348/416 |

FOREIGN PATENT DOCUMENTS
0237989 9/1987 European Pat. Off. .

*Primary Examiner*—Tommy P. Chin
*Assistant Examiner*—Richard Lee
*Attorney, Agent, or Firm*—Barry R. Lipsitz

[57] ABSTRACT

Digital video signals are adaptively compressed for communication to a receiver. Superblocks, each containing a plurality of blocks of digital video data, are compressed using PCM, DPCM with a general motion vector for the entire superblock, and DPCM with a specific motion vector for each block contained within a superblock. The result of each compression mode is compared after accounting for overhead data, to determine which results in the least amount of data for each block. These blocks are assembled into a superblock, and compared together with necessary overhead and motion vector data to the same superblock processed using all PCM as well as the superblock processed using all DPCM. The comparison determines which compression mode produces the least amount of data for the superblock. The most compact superblock is selected for transmission. The transmitted superblocks are decoded by a decoder that recovers the necessary motion vectors and overhead information which identifies the type of compression used to provide the superblock.

20 Claims, 7 Drawing Sheets

ADAPTIVE COMPRESSION OF DIGITAL VIDEO DATA USING DIFFERENT MODES SUCH AS PCM AND DPCM

BACKGROUND OF THE INVENTION

The present invention relates to the compression of digital data, and more particularly to a system for processing digitized video signals for transmission in a compressed form. A decoder for the compressed signals is also provided.

Television signals are conventionally transmitted in analog form according to various standards adopted by particular countries. For example, the United States has adopted the standards of the National Television System Committee ("NTSC"). Most European countries have adopted either PAL (Phase Alternating Line) or SECAM standards.

Digital transmission of television signals can deliver video and audio services of much higher quality than analog techniques. Digital transmission schemes are particularly advantageous for signals that are broadcast via a cable television network or by satellite to cable television affiliates and/or directly to home satellite television receivers. It is expected that digital television transmitter and receiver systems will replace existing analog systems just as digital compact discs have largely replaced analog phonograph records in the audio industry.

A substantial amount of digital data must be transmitted in any digital television system. This is particularly true where high definition television ("HDTV") is provided. In a digital television system, a subscriber receives the digital data stream via a receiver/descrambler that provides video, audio, and data to the subscriber. In order to most efficiently use the available radio frequency spectrum, it is advantageous to compress the digital television signals to minimize the amount of data that must be transmitted.

The video portion of a television signal comprises a sequence of video "frames" that together provide a moving picture. In digital television systems, each line of a video frame is defined by a sequence of digital data bits referred to as "pixels". A large amount of data is required to define each video frame of a television signal. For example, 7.4 megabits of data is required to provide one video frame at NTSC resolution. This assumes a 640 pixel by 480 line display is used with 8 bits of intensity value for each of the primary colors red, green, and blue. High definition television requires substantially more data to provide each video frame. In order to manage this amount of data, particularly for HDTV applications, the data must be compressed.

Video compression techniques enable the efficient transmission of digital video signals over conventional communication channels. Such techniques use compression algorithms that take advantage of the correlation among adjacent pixels in order to derive a more efficient representation of the important information in a video signal. The most powerful compression systems not only take advantage of spatial correlation, but can also utilize similarities among adjacent frames to further compact the data. In such systems, differential encoding is usually used to transmit only the difference between an actual frame and a prediction of the actual frame. The prediction is based on information derived from a previous frame of the same video sequence.

An example of a video compression system using motion compensation is described in Ninomiya and Ohtsuka, "A Motion-Compensated Interframe Coding System for Television Pictures," *IEEE Transactions on Communications*, Vol. COM-30, No. 1, January 1982. The motion estimation algorithm described therein is of the block-matching type. In this case, a motion vector is determined for each block in the current frame of an image by identifying a block in the previous frame which most closely resembles the particular block. The entire current frame can then be reconstructed at a decoder by sending the difference between the corresponding block pairs, together with the motion vectors that are required to identify the corresponding pairs. Often, the amount of transmitted data is further reduced by compressing both the displaced block differences and the motion vector signals. Block matching motion estimation algorithms are particularly effective when combined with block-based spatial compression techniques such as the discrete cosine transform (DCT).

Other examples of motion compensation systems can be found in U.S. Pat. Nos. 4,802,006 to Iinuma, et al., entitled "Signal Processing Unit for Producing a Selected One of Signals Predictive of Original Signals," 4,816,906 to Kummerfeldt, et al., entitled "Method for Motion-Compensated Frame-to-Frame Prediction Coding," 4,827,340 to Pirsch, entitled "Video-Signal DPCM Coder with Adaptive Prediction," 4,897,720 to Wu, et al., entitled "Circuit Implementation of Block Matching Algorithm," and European patent publication no. 0 237 989 to Takenaka, et al., entitled "Differential Coding Apparatus Having an Optimum Predicted Value Determining Circuit." In the '340 patent, adaptive differential pulse code modulation (DPCM) switching is effected on a block-by-block basis between different predictors, such as a two-dimensional intraframe predictor and a pure interframe predictor. The block sizes of the different predictors is the same.

Like most other motion estimation algorithms, the performance of the block-matching method is dependent on how well the movement from one frame to the next can be modeled as a simple translation. In television applications, movements may involve zooming, rotation, and many other complex distortions that cannot be accurately modeled as a simple translation. In such cases, compression artifacts are more likely to become visible since the accuracy of the prediction is reduced.

U.S. Pat. No. 5,068,724 to Krause, et al, entitled "Adaptive Motion Compensation for Digital Television," incorporated herein by reference, discloses a scheme for improving the performance of motion compensated video signal compression systems. A set of pixel data is compressed without motion compensation ("PCM") to provide a first compressed video signal. The pixel data is compressed using motion compensation ("DPCM") to provide a second compressed video signal. The data in the first and second compressed video signals is quantified and a comparison is made to determine which contains the least data. Successive sets of pixel data are sequentially compressed and quantified and the compressed video signal having the least data for each particular set is selected. The selected signals are encoded to identify them as motion compensated or nonmotion compensated signals and combined to provide a compressed video signal data stream for transmission.

Commonly assigned, copending U.S. Pat. No. application Ser. No. 07/784,474 filed on Oct. 24, 1991 for "Adaptive Motion Compensation Using a Plurality of Motion Compensators," now U.S. Pat. No. 5,235,419 also incorporated by reference, describes a scheme in which a plurality of block matching motion compensators, each using a different block size, compare current video image data to prior video image data. Video image data output from the motion compensators is compressed. The compressed data from each motion compensator is compared to find which motion compensator results in the least amount of compressed data for a region of a current video image corresponding to the smallest of the block sizes. The compressed data having the lowest bit count is transmitted to a receiver. A recovered motion vector is used in reconstructing current video image data from the transmitted data and previously received video image data.

It would be advantageous to provide an even more efficient system for adaptively compressing digital video data. It would be further advantageous to provide such a system that selects between PCM and DPCM data for transmission, and among different DPCM modes. Such a system should be able to select between PCM and DPCM compression modes, and if DPCM is selected, determine which of different DPCM modes will provide the least amount of data for transmission. It would be further advantageous to provide such a system that can be manufactured in a cost effective manner.

The present invention provides an encoder for adaptively compressing digital video data which enjoys the aforementioned advantages, as well as a receiver for decoding the signals provided by the encoder.

SUMMARY OF THE INVENTION

In accordance with the present invention, apparatus is provided for adaptively compressing digital video data provided in the form of superblocks. Each superblock contains a plurality of blocks of digital video data. Means are provided for compressing a superblock using first, second and third different compression modes to provide three compressed outputs for comparison. First comparing means compare the amount of compressed data for each block of the superblock resulting from each of the compression modes. In effecting the comparison, the first comparing means account for selection overhead that is necessary to identify the ultimate selection made by the first comparing means. The first comparing means select the compression mode for each block that results in the least amount of compressed data, including selection overhead, for the block. Second comparing means compare the amount of compressed data for the superblock which results from:

(i) the first compression mode together with first compression mode overhead data associated therewith, (ii) the second compression mode together with second compression mode overhead data associated therewith, and (iii) the blocks selected by the first comparing means together with adaptive mode overhead data associated with the selected blocks in addition to the selection data for each selected block.

The second comparing means determine which of (i), (ii) and (iii) represents the least amount of data to be transmitted for the superblock. Means are provided for outputting the superblock in a compressed form obtained using the compression mode that the second comparing means determines will result in the least amount of data for transmission.

In an illustrated embodiment, the first compression mode compresses the superblock without motion compensation (PCM). The second compression mode compresses each block forming the superblock with motion compensation based on a general motion vector for the superblock (superblock DPCM). The third compression mode compresses each individual block forming the superblock with motion compensation based on a specific motion vector for each block (block DPCM).

The first compression mode overhead data can include a code word identifying the compressed data as first compression mode data (e.g., PCM data). The second compression mode overhead data can include the general motion vector and a code word identifying the compressed data as second compression mode data (e.g., superblock DPCM data). The adaptive mode overhead data can comprise the general motion vector and two code words. The first code word identifies the blocks as those selected by the first comparing means (block DPCM data). The second code word identifies each block selected by the first comparing means as one of PCM data generated by the first compression mode, DPCM data generated by the second compression mode, and DPCM data generated by the third compression mode. The adaptive mode overhead data will further include data indicative of the specific motion vector associated with each block selected by the first comparing means that comprises block DPCM data (i.e., data generated by the third compression mode).

In the illustrated embodiment, luminance blocks and chrominance blocks are separately processed. The superblocks are luminance blocks and the apparatus further comprises means for including corresponding chrominance data in each of categories (i), (ii) and (iii) compared by the second comparing means. The chrominance data included in category (i) is PCM chrominance data. The chrominance data included in category (ii) is DPCM chrominance data. The chrominance data included in category (iii) for each block is PCM chrominance data when PCM provides the least chrominance data for transmission and DPCM chrominance data when DPCM provides the least chrominance data for transmission. A chrominance data encoder determines which of the PCM and DPCM modes provides the least amount of chrominance data.

In the illustrated embodiment, the second comparing means comprise a first accumulator for accumulating the data resulting from the first compression mode for the first superblock together with the first compression mode overhead data and corresponding chrominance data. A second accumulator accumulates the data resulting from the second compression mode for the superblock together with the second compression mode overhead data and corresponding chrominance data. A third accumulator accumulates the data resulting from the blocks selected by the first comparing means together with the adaptive mode overhead data, the selection data for each block, and corresponding chrominance data. A comparator compares the amount of data accumulated by each accumulator to determine which contains the least amount of data for transmission.

Motion compensation means responsive to the second comparing means are provided for generating predictor signals for the second and third compression modes. The motion compensation means also generate the general and specific motion vectors, as required. Means are provided for compressing the specific motion vectors by differentially encoding them with the general motion vector. This technique further reduces the amount of data which must be transmitted.

The chrominance encoder can include means for compressing chrominance data using a first chrominance compression mode (e.g., PCM) and a second chrominance compression mode (e.g., DPCM). Third comparing means compare the amount of compressed chrominance data for each block of the superblock resulting from each of the first and second chrominance compression modes after accounting for selection overhead necessary to identify a selection made by the third comparing means. The third comparing means output the compressed chrominance data from either the first or second chrominance compression modes, depending on which of the compression modes produce the least amount of compressed chrominance data, including selection overhead data, for each block. The compressed chrominance data from the first chrominance compression mode is included in category (i) compared by the second comparing means. The compressed chrominance data from the second chrominance compression mode is included in category (ii) compared by the second comparing means. The compressed chrominance data output by the third comparing means is included in category (iii) compared by the second comparing means. Motion compensation means responsive to the second comparing means are provided for generating predictor signals for the second chrominance compression mode.

A method is provided for selecting compression modes for different portions of data to be transmitted. A plurality of the portions of data (e.g., datablocks) is compressed using first, second and third different compression modes. The portions compressed using the first compression mode are accumulated together with first overhead data to provide a first set of accumulated data. The portions compressed using the second compression mode are accumulated together with second overhead data to provide a second set of accumulated data. Each of the portions of the plurality is also compressed using whichever of the compression modes meets a first selection criterion for the particular portion. For example, each block of a superblock will be compressed using whichever of PCM, superblock DPCM, or block DPCM produces the least data, including selection and other overhead data, for the particular block. The individually compressed portions are accumulated, together with third overhead data which includes the block selection data, to provide a third set of accumulated data. The first, second and third sets of accumulated data are compared to determine which set meets a second selection criterion. The plurality of portions is then provided for transmission in a compressed form determined by whichever of the first, second and third sets of accumulated data meets the second selection criterion. In the illustrated embodiment, the first selection criterion selects the least amount of compressed data for each of the portions and the second selection criterion selects the least amount of accumulated data.

Decoder apparatus is provided for recovering video data from the compressed blocks selected for transmission at the encoder. The decoder includes means for receiving superblocks of compressed video data. The superblocks contain individual blocks that have each been compressed using one of a plurality of compression modes. Means are coupled to the receiving means for retrieving, from each received superblock, one of first overhead data, second overhead data, and third overhead data. The first overhead data is indicative of a first compression mode used to compress the whole superblock. The second overhead data is indicative of a second compression mode used to compress the whole superblock. The third overhead data indicates that the individual blocks contained in the superblock were compressed using a plurality of different compression modes. Means responsive to the first overhead data decode a received superblock using a decompression mode corresponding to the first compression mode. Means responsive to the second overhead data decode a received superblock using a decompression mode corresponding to the second compression mode. Means responsive to the third overhead data identify the compression mode used to compress each individual block of the received superblock and decode the received superblock using a decompression mode for each individual block that corresponds to the compression mode used to compress the block. In an illustrated embodiment of the decoder, a first one of the compression modes compresses the superblocks without motion compensation. A second one of the compression modes compresses each block in a superblock with motion compensation based on a general motion vector for the superblock. A third one of the compression modes compresses each block in a superblock with motion compensation based on a specific motion vector for each block.

DETAILED DESCRIPTION OF THE INVENTION

Figure 1:
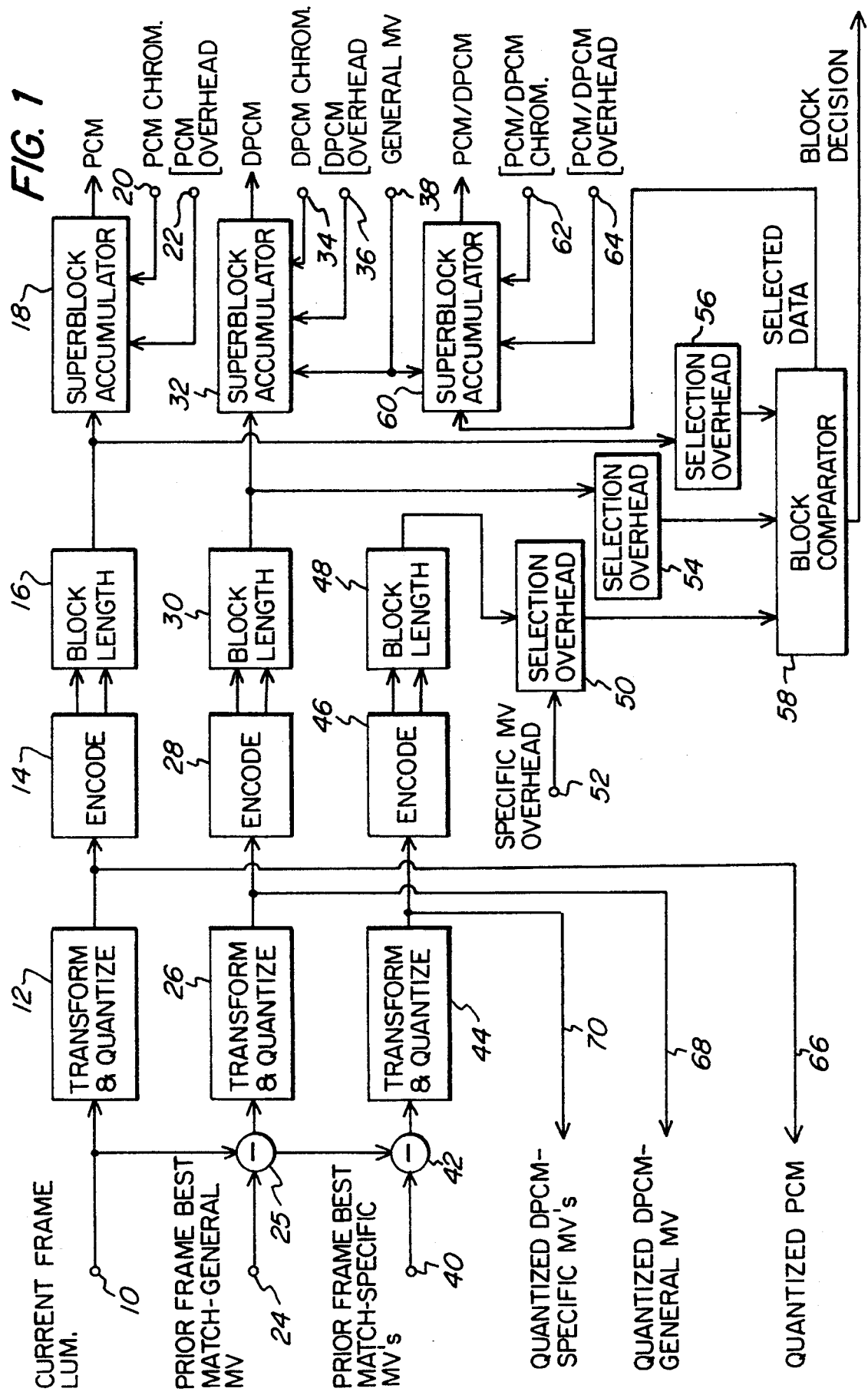
FIGS. 1 and 2 together provide a block diagram of a luminance encoder in accordance with the present invention.

The present invention provides an improvement in the performance of motion compensated video signal compression systems. In digital television systems, each line of a video frame is defined by a sequence of pixels. Due to the large amount of pixel data that must be transmitted to define the picture in a television program, it is desirable to compress the data prior to transmission. In one compression technique, motion compensation is used to predict the data for a current frame from data of a previous frame. As used herein, the term "motion compensation" includes the case where the previous frame is used for a prediction, but there is no displacement between the current and previous frame portions of an image being compared for the prediction. In such cases, the motion vector will be zero.

In motion compensation systems, only the data representing the difference between the predicted signal and the actual signal is compressed and encoded for transmission. Typically, the video image data is processed on a block-by-block basis. To facilitate the implementation of such systems, the blocks may be grouped into superblocks, each superblock containing the same number of blocks.

The effectiveness of block based motion estimation algorithms may be dependent on the size of the block that is used to match the current frame with the previous frame. A large block size will work well in regions where the image is still or translating uniformly. In such cases, a large block size is preferred to a small block size, since there is less overhead required to transmit the motion vectors associated with each of the image blocks. In applications requiring very high compression rates, the savings can be substantial. In other cases, where complex movements from one frame to the next cannot be accurately modeled as a simple translation, a small block size may perform better. The present invention takes advantage of these differences by providing a compression system using adaptive motion compensation, wherein a plurality of motion compensators using different block sizes are compared to determine which motion compensator results in the least amount of data, after compression and accounting for overhead data, on a block-by-block basis.

Motion compensation does not always produce less data. This is particularly true where there is a scene change or when rapid and complex changes occur from one frame to the next. In such instances, it may be advantageous to transmit a block of information in a non-motion compensated format (PCM) instead of with motion compensation (DPCM). The present invention tests the result of both PCM and DPCM processing on individual blocks, to determine which method offers the most efficient (i.e., compact) representation over a region of the image. The overhead required to inform the decoder which mode of transmission is used must be accounted for in determining whether PCM or DPCM will result in the least amount of data for transmission.

The present invention optimizes the compression of video data by determining, for each superblock, whether it is most efficient to transmit the superblock as all PCM data, all DPCM data, or as a combination of PCM and DPCM data. In the event that PCM data is most efficient, no motion vector will be transmitted. In the event that all DPCM encoding is most efficient for the superblock, a general motion vector for the whole superblock is transmitted. In the event that a combination of DPCM and PCM blocks within the superblock will provide the least compressed data, including overhead, the general motion vector will be transmitted together with specific motion vector data for each DPCM block. The specific motion vectors are differentially encoded with the general motion vector.

Figure 2:
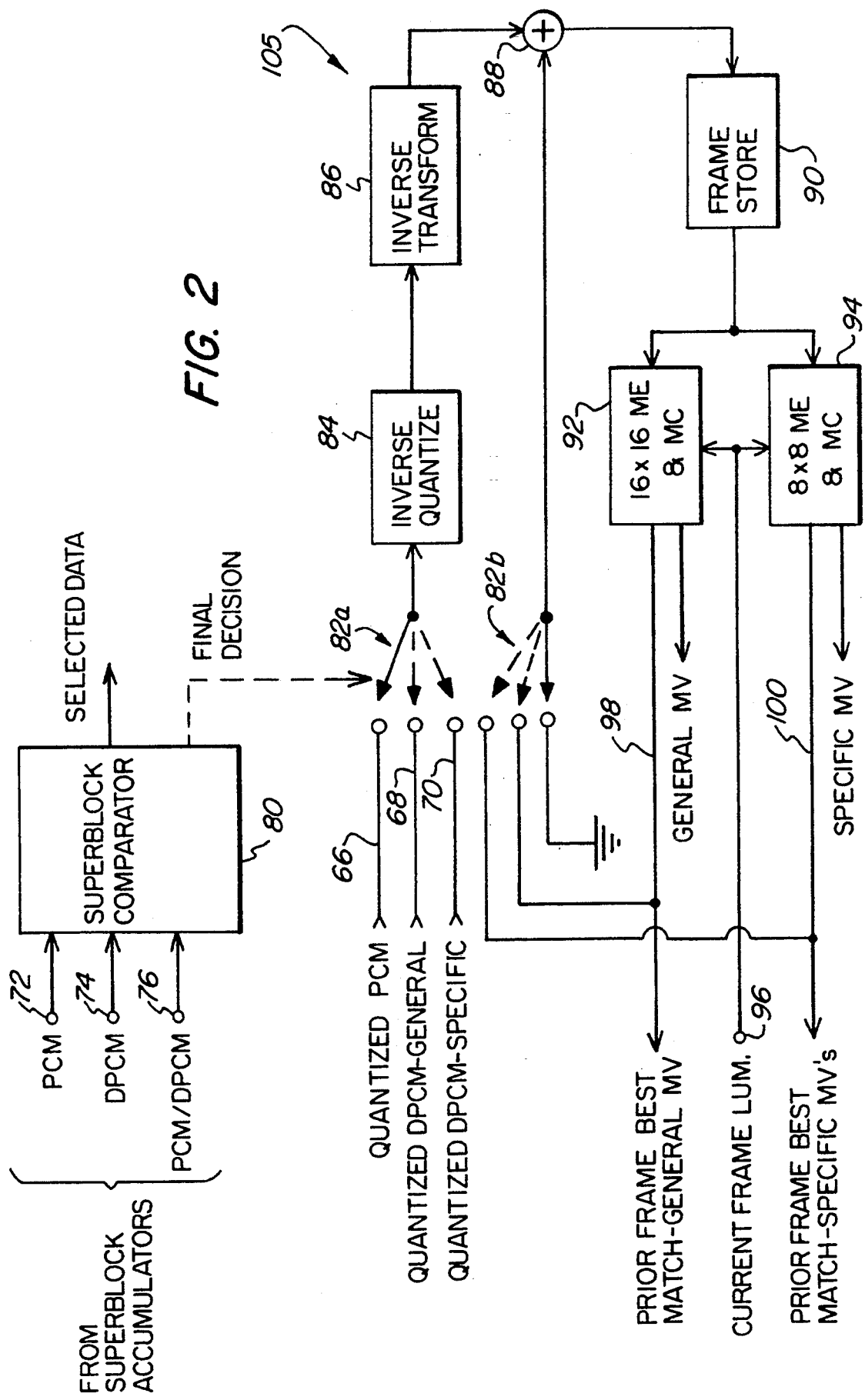
Figure 3:
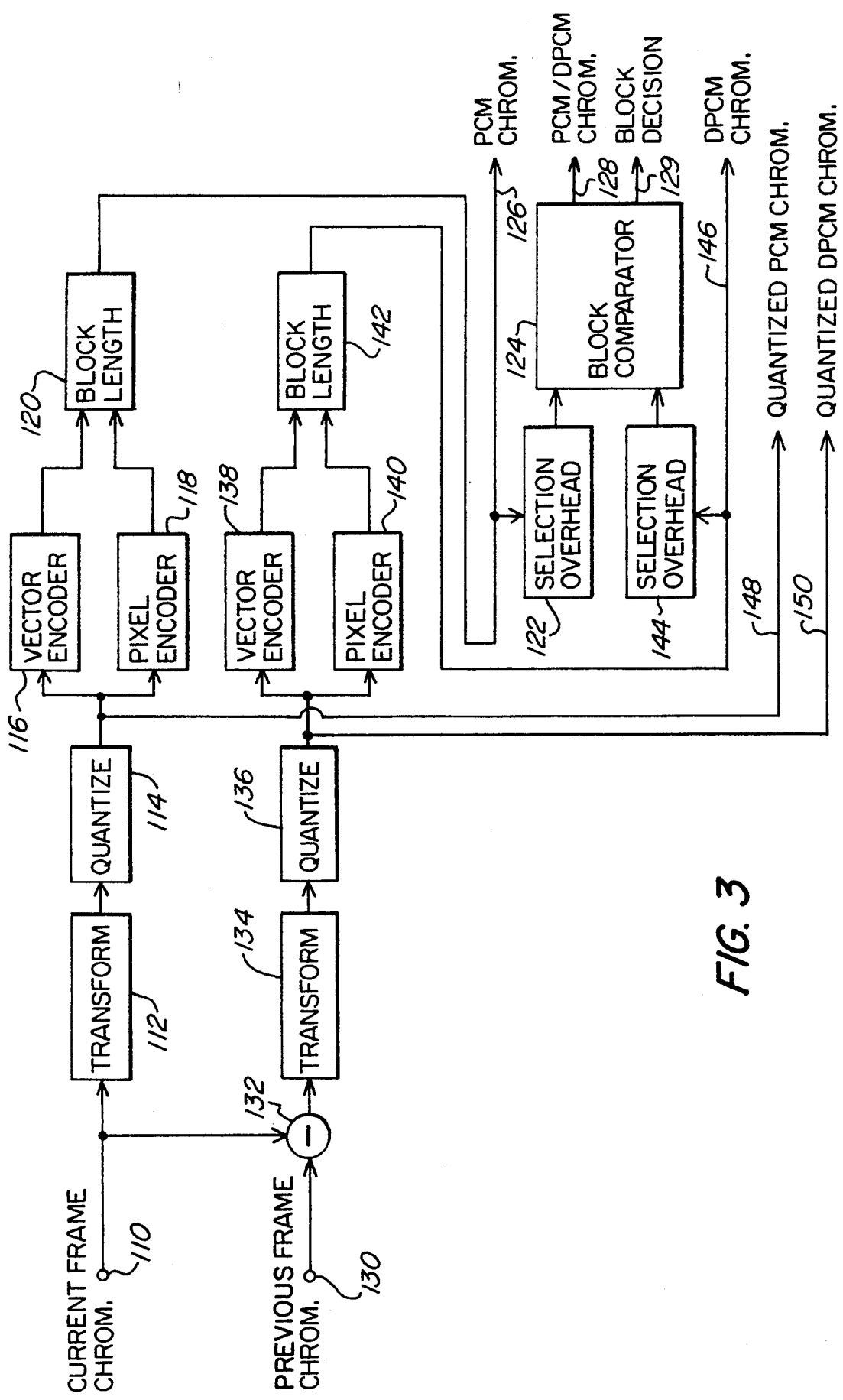
FIGS. 3 and 4 together provide a block diagram of a chrominance encoder in accordance with the present invention.
Figure 4:
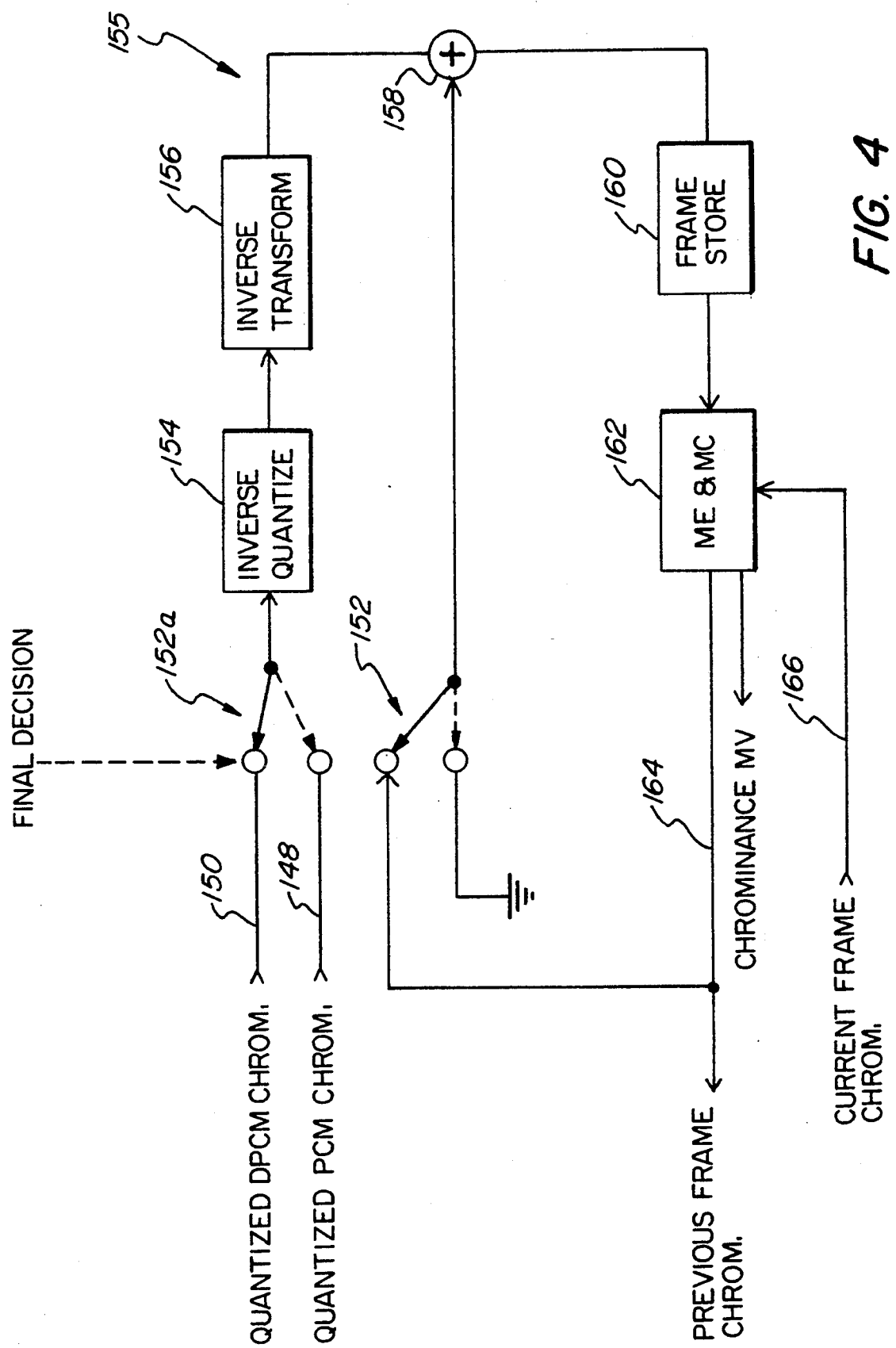
Figure 7:
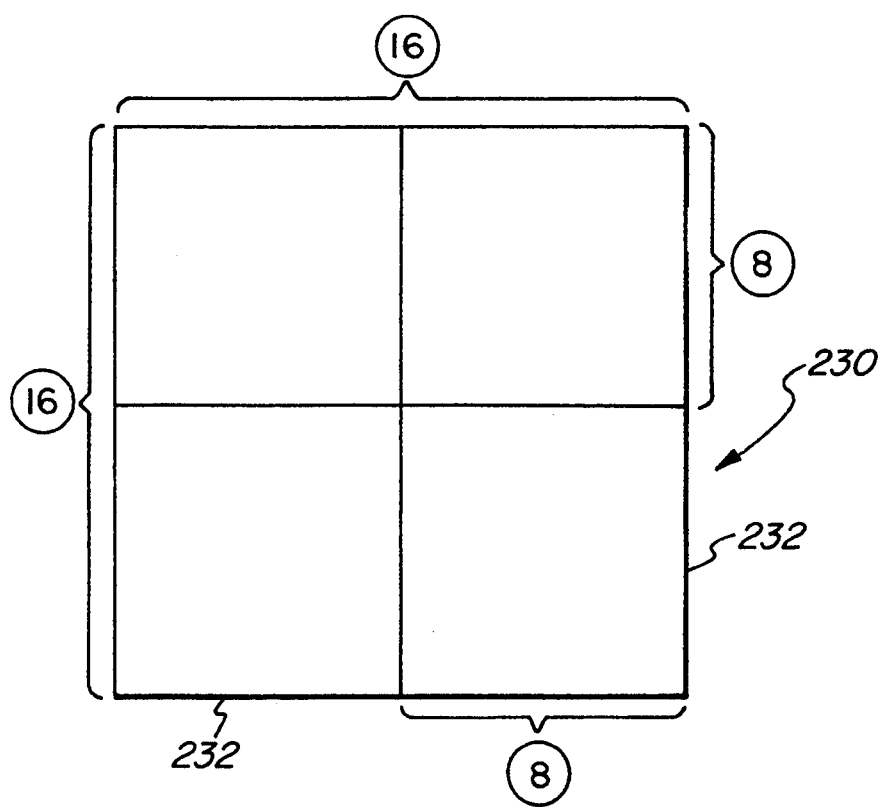
FIG. 7 is a diagrammatic illustration of a superblock containing four individual blocks.

In a preferred embodiment of the present invention, luminance and chrominance processing are separate and occur in parallel. FIGS. 1 and 2 are a block diagram of the luminance portion of the encoder. FIGS. 3 and 4 are a block diagram of the chrominance portion of the encoder. In the illustrated embodiment, each luminance block is 8×8 pixels and each superblock consists of four such blocks. This is illustrated in FIG. 7, wherein superblock 230 consists of four 8×8 blocks 232. As a result, the overall size of superblock 230 is 16×16 pixels.

Also in the illustrated embodiment, chrominance consists of U and V signals which are each subsampled by four. After U, V are subsampled, each U, V superblock becomes an 8×8 block. U, V signals are processed in a series pipeline. It should be appreciated that the block and superblock sizes discussed herein are for illustrative purposes only. The invention can be practiced using blocks and superblocks of any desired size.

Turning now to FIG. 1, a block of current frame luminance data is input to transform and quantize circuitry 12 via an input terminal 10. The pixel data is transformed, for example using the well known discrete cosine transform (DCT) and quantized in a conventional manner. The resulting block of transform coefficients is encoded in an encoder 14 which includes both a vector encoder and a pixel encoder as well known in the art. The vector encoder and pixel encoder operate in parallel and their lengths are accumulated in block length accumulator 16. The block is then input to a PCM superblock accumulator 18, where the four blocks corresponding to a superblock are accumulated for subsequent comparison to the same superblock, processed using different compression modes, as explained below.

The processing of the current frame luminance blocks through the path which includes transform and quantize circuits 12, vector and pixel encoders 14, block length accumulator 16 and superblock accumulator 18 compresses the blocks using a first compression mode without motion compensation, i.e., PCM. A second compression mode using motion compensation, and having a general motion vector for an entire superblock is provided in a second path which includes a subtracter 25, transform and quantize circuits 26, vector and pixel encoders 28, block length accumulator 30 and DPCM superblock accumulator 32. In this path, prior frame data which best matches the current frame luminance block, based on a general motion vector for the superblock of which the block is part, is input at terminal 24. This prior frame best match data is subtracted in subtracter 25 from the current frame luminance block provided at terminal 10. The difference is input to transform and quantize circuits 26, which provide the same function as circuits 12 in the first compression mode path. Blocks of quantized transform coefficients output from circuits 26 are encoded by encoder 28, which outputs the encoded vector data and encoded pixel data to block length accumulator 30. The accumulated data for a block is input to DPCM superblock accumulator 32.

In a third compression mode path, the data from a prior frame which best matches the current block based on a specific motion vector for that block is input at terminal 40, and subtracted in subtracter 42 from the current frame luminance block input at terminal 10. The resultant difference signal is transformed and quantized in circuits 44 which are equivalent to circuits 12 and 26 in the first and second compression mode paths, respectively. The blocks of quantized transform coefficients are encoded by encoder 46, and the encoded vector and encoded pixel data is input to a block length accumulator 48.

Once the data for an entire block has been accumulated in accumulator 48, it is input to a block comparator 58 after "selection overhead" data has been added thereto as indicated at 50. The selection overhead for blocks processed in the third compression mode path (i.e., those blocks that are processed using DPCM and a specific motion vector) includes specific motion vector overhead data input at terminal 52. The specific motion vector overhead data comprises the difference between the specific motion vector for the block being processed and the general motion vector used for the entire superblock. The selection overhead added at 50 also includes a code word that identifies the block from block length accumulator 48 as being compressed in the third mode compression path.

Block comparator 58 compares the amount of compressed data in the block with the added selection overhead data to the amount of compressed data in a block output from block length accumulator 30 (second mode compression path) with selection overhead added at 54, and a PCM block output from block length accumulator 16 (first compression mode path) after having selection overhead added to it at 56. The block (with associated selection overhead) that provides the least amount of data overall is selected by block comparator 58 and output to PCM/DPCM superblock accumulator 60. Block comparator 58 also outputs a decision code word that identifies which of the three blocks (PCM, DPCM-general motion vector, or DPCM-specific motion vector) it selected.

After all four blocks of a superblock have been processed by the first, second and third compression mode paths, superblock accumulator 18 will hold an entire PCM superblock, superblock accumulator 32 will hold an entire DPCM superblock processed using the general motion vector, and superblock accumulator 60 will hold an entire PCM/DPCM superblock wherein each individual block has been processed using one of PCM, DPCM with the general motion vector, or DPCM with a specific motion vector. In order to enable the encoder to decide which of the superblocks will provide the least amount of data for transmission, overhead that must be carried with the superblocks must be added. For the PCM superblock, PCM chrominance data is added via terminal 20. PCM overhead data is added via terminal 22. The PCM overhead data merely identifies the superblock as a PCM superblock. The data added via terminals 20, 22 is accumulated together with the PCM superblock, at which point superblock accumulator 18 will hold the data for the encoded PCM luminance superblock as well as the corresponding chrominance data and overhead data.

Similarly, DPCM superblock accumulator 32 will hold the DPCM encoded luminance superblock, together with corresponding DPCM chrominance data added via terminal 34, DPCM overhead data added via terminal 36, and the general motion vector added via terminal 38. The DPCM overhead data comprises a code word identifying the superblock as a DPCM superblock which has been encoded on the basis of the general motion vector.

Superblock accumulator 60 will contain the PCM/DPCM superblock data together with corresponding PCM or DPCM chrominance data, PCM/DPCM overhead data, and the general motion vector. The general motion vector is necessary to decode the differentially encoded specific motion vectors (previously appended via terminal 52) for any selected blocks that have been encoded using a specific motion vector. The chrominance data added via terminal 62 will be either PCM chrominance or DPCM chrominance data, whichever is determined by the chrominance encoder (described below) to provide the least amount of data for transmission. The PCM/DPCM overhead data added via terminal 64 contains a first code word that identifies the superblock held in accumulator 60 as an "adaptive mode" superblock in which each individual block is encoded using one of PCM, DPCM with a general motion vector or DPCM with a specific motion vector. The PCM/DPCM overhead also includes a second code word that identifies each individual block as a PCM block, a DPCM block based on the general motion vector, or a DPCM block based on a specific motion vector.

The accumulated data from each of accumulators 18, 32, 60 is input to a superblock comparator 80 illustrated in FIG. 2. Specifically, the accumulated data from PCM accumulator 18 is input to superblock comparator 80 via terminal 72. The data from DPCM superblock accumulator 32 is input via terminal 74. The data from PCM/DPCM superblock accumulator 60 is input via terminal 76. Superblock comparator 80 compares the total amount of data from each of the superblock accumulators, and determines which contains the least amount of data for transmission. The decision is used to actuate switches 82a and 82b of motion compensation circuitry generally designated 105. Switch 82a selects one of quantized PCM data, quantized DPCM-general motion vector data, or quantized DPCM-specific motion vector data for use in obtaining previous frame data to store in a frame store 90. The quantized PCM data, if chosen, is input from transform and quantize circuitry 12 (FIG. 1) via line 66. The quantized DPCM-general motion vector data, if selected by switch 82a, is input from transform and quantize circuitry 26 via line 68. The quantized DPCM-specific motion vector data, if selected, is input from transform and quantize circuitry 44 via line 70.

The quantized coefficients selected by switch 82a in response to the decision of superblock comparator 80 are input to inverse quantizer 84 and inverse transform circuit 86 to recover the original data block or difference signal input to the corresponding transform and quantize circuit 12, 26 or 44 of FIG. 1. For DPCM difference signals, adder 88 is used to add back either the prior frame best match data for the general motion vector case or the prior frame best match data for the specific motion vector case, depending on which DPCM mode superblock comparator 80 determined will provide the least amount of data for transmission. In the event that comparator 80 determined that the PCM mode provides the least amount of data for transmission, switch 82b will ground the switched input of adder 88, since motion compensation is not used.

Frame store 90 will store the previous frame data. This is used by $16 \times 16$ pixel superblock motion estimator and motion compensator 92 and $8 \times 8$ pixel block motion estimator and motion compensator 94 to generate the prior frame best match data for the general motion vector case and prior frame best match data for the specific motion vector case, respectively. The motion estimator and motion compensator circuits 92, 94 are well known components that compare the current frame luminance data input via terminal 96 to the previous frame data stored in frame store 90 to locate the best match on a block-by-block basis. The best matched data for the general motion vector case is output via line 98 to terminal 24 (FIG. 1). The best matched data for the specific motion vector case is output via line 100 to terminal 40 of FIG. 1.

FIGS. 3 and 4 illustrate the portion of the encoder that processes chrominance data. The chrominance processing is similar to the luminance processing, except that instead of providing separate general motion vector and specific motion vector DPCM compression modes, only one DPCM compression mode is provided since chrominance processing occurs only on a $8 \times 8$ block basis. The current frame chrominance data is input to transform circuitry 112 via terminal 110. The data is transformed, e.g., using the DCT algorithm, and quantized in quantize circuit 114. Transform circuit 112 and quantize circuit 114 are equivalent to transform and quantize circuit 12 of FIG. 1.

The quantized transform coefficients output from quantizer 114 are encoded in a vector encoder 116 and a pixel encoder 118 in the same manner that the luminance data is encoded by encoder 14 (FIG. 1). The encoded vector and pixel information is input to a block length accumulator 120 similar to block length accumulator 16 of FIG. 1. When all of the data for a block has been accumulated, it is output via line 126 for input to terminal 20 of superblock accumulator 18, shown in FIG. 1.

Previous frame chrominance data input to terminal 130 is subtracted from the current frame chrominance data in a subtracter 132. The result is transformed and quantized in circuits 134, 136, respectively. The quantized transform coefficients are encoded by vector encoder 138 and pixel encoder 140, and accumulated in block length accumulator 142. Each DPCM chrominance block is output via line 146 for input to terminal 34 of DPCM superblock accumulator 32.

The PCM chrominance data output from block length accumulator 120 and the DPCM chrominance data output from block length accumulator 142 is input to a block comparator 124 after the addition of selection overhead at 122, 144, respectively. Comparator 124 determines which of the PCM and DPCM chrominance data, after accounting for the selection overhead, provides the least amount of data. The block which contains the least data is output via line 128 to terminal 62 of PCM/DPCM superblock accumulator 60. A code word indicative of which block was chosen by comparator 124 ("block decision") is output via line 129 for inclusion in the PCM/DPCM overhead input to PCM/DPCM superblock accumulator 60 via terminal 64. The PCM/DPCM overhead will also include the chrominance motion vector necessary to decode each DPCM chrominance block that is chosen.

The quantized PCM chrominance data output from quantizer 114 is input via line 148 to a switch 152a illustrated in FIG. 4. The quantized DPCM chrominance data from quantizer 136 is output via line 150 to switch 152a. The final decision made by superblock comparator 80 is used to actuate switches 152a and 152b to enable chrominance motion compensator 155 to properly reconstruct a previous frame of chrominance data for storage in frame store 160. The data selected by switch 152a is inverse quantized and inverse transformed at 154, 156, respectively. Where PCM processing is selected by switch 152a, the data output from inverse transform circuit 156 will correspond to the current frame chrominance data input at terminal 110 (FIG. 3). Switch 152b will be coupled to ground, so that the data passes through summer 158 to frame store 160. In the event that DPCM chrominance data is processed, the output of inverse transform circuit 156 will correspond to the difference signal output from subtracter 132 (FIG. 3). This data will be added to the previous frame chrominance data coupled through switch 152b, to recreate the previous frame data for storage in frame store 160.

Motion estimator and motion compensator 162 are conventional circuits that compare the current frame chrominance data received via line 166 to the previous frame chrominance data stored in frame store 160 to generate the best match previous frame chrominance data for output on line 164. Motion estimator and compensator 162 will also output the chrominance motion vector identifying where the best match previous frame chrominance data is found in the previous frame. The best match previous frame chrominance data is also coupled via line 164 to terminal 130 (FIG. 3).

Successive superblocks defining a video image are compressed in accordance with the compression mode selected for that superblock by the encoder of FIGS. 1 and 2. The successive superblocks are transmitted via satellite, cable or terrestrial transmission for receipt and reconstruction of a video image by a receiver.

Figure 5:
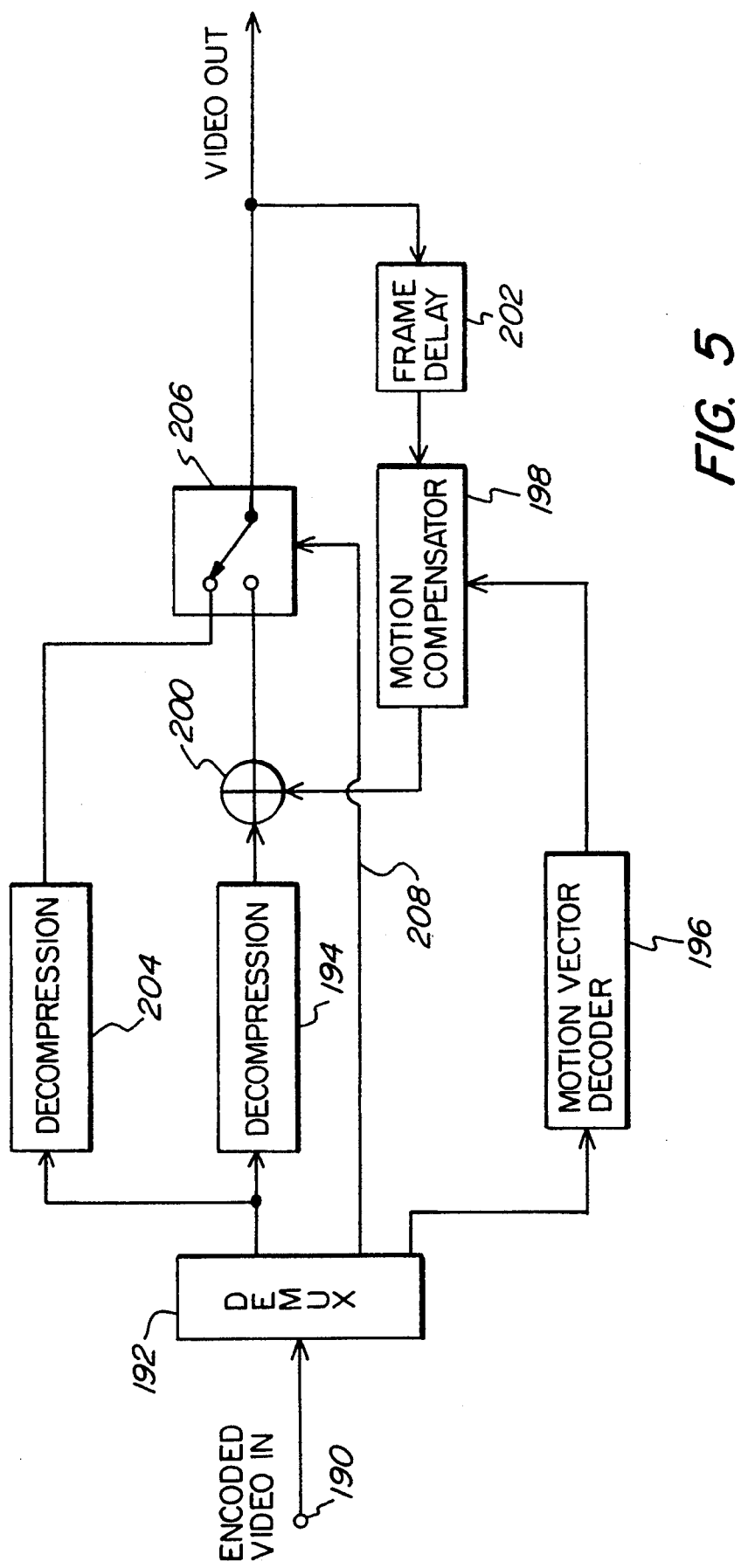
FIG. 5 is a block diagram of a decoder in accordance with the present invention.
Figure 6:
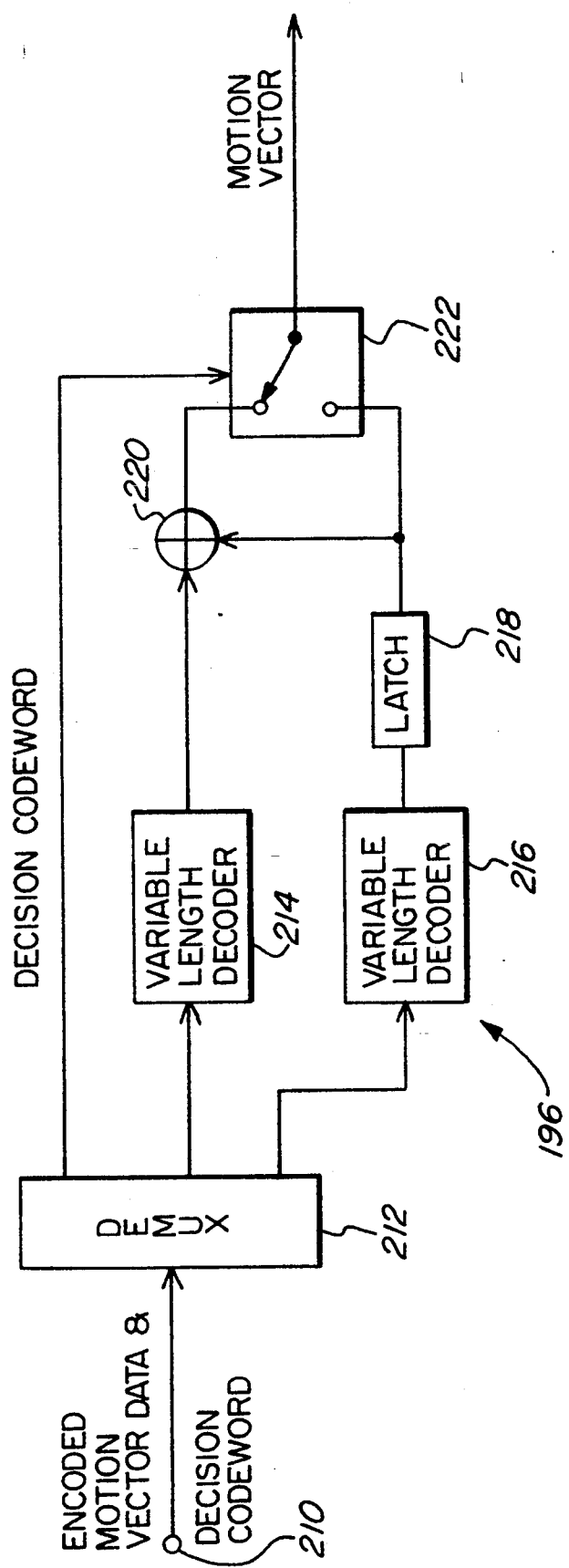
FIG. 6 is a block diagram of the motion vector decoder illustrated in FIG. 5.

FIGS. 5 and 6 illustrate a decoder that can be used at a receiver to reconstruct video image data. The received encoded video, which corresponds to the encoded video output from superblock comparator 80 of FIG. 2, contains the selected compressed luminance data together with the corresponding chrominance, overhead and motion vector data as applicable. This data is input via terminal 190 to a demultiplexer 192, which recovers the encoded motion vector data and overhead data. It will be recalled that the overhead data includes a code word identifying whether the superblock was compressed using PCM or DPCM. This code word is carried via line 208 to a switch 206 that couples to the output of decompression circuit 204 or decompression circuit 194 via adder 200.

Decompression circuit 204 decompresses PCM data. Decompression circuit 194 decompresses DPCM data, which is added in adder 200 to previous frame data selected by motion compensator 198 in response to a motion vector output from motion vector decoder 196. A frame delay 202 stores previous frame data for use by motion compensator 198 in a conventional manner. Decompression circuits 194, 204 inverse quantize and inverse transform the received superblock data in the same manner that inverse quantize and inverse transform circuits 84, 86 process luminance data (FIG. 2) and inverse quantize and inverse transform circuits 154, 156 (FIG. 4) process chrominance data at the encoder. Although the separate processing of luminance and chrominance data is not illustrated in FIG. 5, it will be appreciated that this data may be separately processed as is done at the encoder.

FIG. 6 is a block diagram illustrating the components of motion vector decoder 196 in greater detail. The encoded motion vector data and decision code word from demultiplexer 192 (FIG. 5) is input at terminal 210 to a demultiplexer 212. The decision code word, general motion vector, and specific motion vector difference signal are demultiplexed by demultiplexer 212. The decision code word referred to is the code word in the overhead data that indicates whether a specific block has been encoded using a specific motion vector as opposed to the general motion vector. The decision code word is used to actuate a switch 222 to select either the reconstructed general motion vector or the reconstructed specific motion vector, as appropriate. The specific motion vector difference signal is input to a variable length decoder 214 and summed at adder 220 with the general motion vector after it has been decoded by a variable length decoder 216. It should be appreciated that all of the superblock, overhead and motion vector data may be variable length encoded at the encoder to further reduce the total amount of data to be transmitted. However, in the event that the general motion vector and specific motion vector difference signals are not variable length encoded, variable length decoders 214, 216 will not be necessary.

A latch 218 is used to store the received general motion vector for the equivalent of four blocks, so that the general motion vector needs to be transmitted only once for every group of four blocks, i.e., one superblock. Switch 222 will output the recovered general motion vector or the recovered specific motion vectors, in response to the decision code word, for use by motion compensator 198 in recovering the best match previous frame data from frame delay 202.

It should now be appreciated that the present invention provides a system for the adaptive compression of video data for transmission. Blocks of video data are compressed using different compression modes, such as PCM, DPCM with a general motion vector for a superblock, and DPCM using specific motion vectors for individual blocks that form the superblock. Each compression mode is compared to determine which provides the least amount of data for a particular block. The blocks are accumulated into superblocks together with necessary overhead data, and the superblocks are compared to determine which compression mode will result in the least amount of data for each superblock. The compression scheme that produces the least amount of data for each superblock is used to prepare that superblock for transmission. At a decoder, the necessary overhead and motion vector information is recovered from the received superblocks. Overhead data specifies the compression mode used to provide each superblock, and this information is used by the decoder in reconstructing the original video data from the received superblocks. In the illustrated embodiment, the decision of a superblock is made from three possible combinations. These are all PCM blocks, all DPCM blocks with a general motion vector, and superblocks containing individual blocks which may be DPCM coded or PCM coded. In the latter case, the DPCM blocks carry a specific motion vector that is differentially encoded with the general motion vector.

The factors considered during the decision as to which superblock to transmit include the code length of each pixel (luminance) and the vector length. Each block can be divided into four sections of vector for both luminance and chrominance. The code length of the chrominance U and V are also considered, as is the code length of the overhead information required to be transmitted for use by the decoder. The code length of the motion vectors includes the differential coding of the general motion vector and the specific motion vectors within each superblock. In order to increase the compression, the DC coefficient of the PCM compression mode can be differentially coded and included in the vector coding of the DC coefficient.

Although the invention has been described in connection with a specific embodiment thereof, those skilled in the art will appreciate that numerous adaptations and modifications may be made thereto without departing from the spirit and scope of the invention as set forth in the claims.

We claim:

1. Apparatus for adaptively compressing digital video data provided in the form of superblocks containing a plurality of blocks of said digital video data, comprising:

means for compressing respective blocks of a superblock using first, second and third different compression modes to provide three compressed outputs for comparison;

first means for comparing the amount of compressed data for each block of said superblock resulting from each of said compression modes after accounting for selection overhead necessary to identify a selection made by said first comparing means, said first comparing means selecting a compression mode from one of said first, second, or third compression modes for each of said blocks that results in the least amount of compressed data, including said selection overhead, for that block;

second means for comparing the amount of compressed data for said superblock resulting from:
(i) said first compression mode together with first compression mode overhead data associated therewith,
(ii) said second compression mode together with second compression mode overhead data associated therewith, and
(iii) the blocks compressed in accordance with respective compression modes selected by said first comparing means together with adaptive mode overhead data associated with the compressed blocks in addition to said selection overhead for each compressed block, said second comparing means determining which of (i), (ii) and (iii) represents the least amount of data to be transmitted for said superblock; and means for outputting said superblock in a compressed form obtained using the compression mode (i), (ii) or (iii) that said second comparing means determines will result in the least amount of data for transmission.

2. Apparatus in accordance with claim 1 wherein:

said first compression mode compresses said superblock without motion compensation;

said second compression mode compresses each of said blocks forming said superblock with motion compensation based on a general motion vector for said superblock; and said third compression mode compresses each of said blocks forming said superblock with motion compensation based on a specific motion vector for each of said blocks.

3. Apparatus in accordance with claim 2 wherein said superblocks are luminance blocks, said apparatus further comprising:

means for including corresponding chrominance data in each of categories (i), (ii) and (iii) compared by said second comparing means.

4. Apparatus in accordance with claim 3 wherein:

the chrominance data included in category (i) is PCM chrominance data;

the chrominance data included in category (ii) is DPCM chrominance data; and the chrominance data included in category (iii) for each of said blocks is PCM chrominance data when PCM provides the least chrominance data for said transmission, and DPCM chrominance data when DPCM provides the least chrominance data for said transmission.

5. Apparatus in accordance with claim 2 further comprising:

motion compensation means responsive to said second comparing means for generating predictor signals for said second and third compression modes and for generating said general and specific motion vectors.

6. Apparatus in accordance with claim 5 further comprising means for compressing said specific motion vectors by differentially encoding them with said general motion vector.

7. Apparatus in accordance with claim 2 wherein said first compression mode overhead data comprises:
a codeword identifying said superblock compressed by said first compression mode as first compression mode data.

8. Apparatus in accordance with claim 7 wherein said second compression mode overhead data comprises:
said general motion vector, and
a codeword identifying the blocks compressed by said second compression mode as second compression mode data.

9. Apparatus in accordance with claim 8 wherein said adaptive mode overhead data comprises:
said general motion vector,
a codeword identifying the blocks as those compressed in accordance with the respective compression modes selected by said first comparing means,
a codeword identifying each of said blocks compressed in accordance with the respective compression modes selected by said first comparing means as one of PCM data generated by said first compression mode, DPCM data generated by said second compression mode, and DPCM data generated by said third compression mode, and
data indicative of the specific motion vector associated with each of said blocks that comprises DPCM data generated by said third compression mode.

10. Apparatus in accordance with claim 1 wherein said superblocks are luminance blocks, said apparatus further comprising:
means for including corresponding chrominance data in each of categories (i), (ii) and (iii) compared by said second comparing means.

11. Apparatus in accordance with claim 10 wherein said second comparing means comprise:
a first accumulator for accumulating the data resulting from said first compression mode for said superblock together with said first compression mode overhead data and said corresponding chrominance data;
a second accumulator for accumulating the data resulting from said second compression mode for said superblock together with said second compression mode overhead data and said corresponding chrominance data;
a third accumulator for accumulating the data resulting from the blocks compressed in accordance with the respective compression modes selected by said first comparing means together with said adaptive mode overhead data, the selection overhead for each block, and said corresponding chrominance data; and
a comparator for comparing the amount of data accumulated by each of said first, second and third accumulators.

12. Apparatus in accordance with claim 1 wherein said superblocks are luminance blocks, said apparatus further comprising:

means for compressing chrominance data using a first chrominance compression mode and a second chrominance compression mode;
third means for comparing the amount of compressed chrominance data for each of said blocks of said superblock resulting from each of said first and second chrominance compression modes after accounting for selection overhead necessary to identify a selection made by said third comparing means, said third comparing means outputting the lesser amount of compressed chrominance data including selection overhead for each of said blocks;
means for including compressed chrominance data from said first chrominance compression mode in category (i) compared by said second comparing means;
means for including compressed chrominance data from said second chrominance compression mode in category (ii) compared by said second comparing means; and
means for including the compressed chrominance data output by said third comparing means in category (iii) compared by said second comparing means.

13. Apparatus in accordance with claim 12 wherein:
said first compression mode compresses said superblock without motion compensation;
said second compression mode compresses each of said blocks forming said superblock with motion compensation based on a general motion vector for said superblock;
said third compression mode compresses each of said blocks forming said superblock with motion compensation based on a specific motion vector for each of said blocks;
said first chrominance compression mode compresses said chrominance data without motion compensation; and
said second chrominance compression mode compresses said chrominance data with motion compensation.

14. Apparatus in accordance with claim 13 further comprising:
motion compensation means responsive to said second comparing means for generating predictor signals for said second and third compression modes and for generating said general and specific motion vectors; and
motion compensation means responsive to said second comparing means for generating predictor signals for said second chrominance compression mode.

15. Apparatus in accordance with claim 14 further comprising means for compressing said specific motion vectors by differentially encoding them with said general motion vector.

16. A method for selecting compression modes for different portions of data to be transmitted, comprising the steps of:
compressing a plurality of said portions using first, second, and third different compression modes;
accumulating said plurality of portions compressed using said first compression mode together with first overhead data to provide a first set of accumulated data;
accumulating said plurality of portions compressed using said second compression mode together with second overhead data to provide a second set of accumulated data;

accumulating, together with third overhead data to provide a third set of accumulated data, said plurality of portions each compressed using whichever of said compression modes meets a first selection criterion for that portion, said first selection criterion basing its selection on the amount of compressed data for each of said portions after accounting for selection data included in said third overhead data;

comparing the first, second and third sets of accumulated data to determine which set meets a second selection criterion based on the amount of accumulated data in said sets; and providing said plurality of portions for transmission in a compressed form determined by whichever one of said first, second and third sets of accumulated data meets said second selection criterion.

17. A method in accordance with claim 16 wherein said first selection criterion selects the least amount of compressed data for each of said portions and said second selection criterion selects the least amount of accumulated data.

18. A method in accordance with claim 16 wherein:
said portions comprise video image data;
said first compression mode compresses said plurality of portions without motion compensation;
said second compression mode compresses each portion with motion compensation based on a general motion vector for said plurality of portions; and
said third compression mode compresses each portion with motion compensation based on a specific motion vector for each portion.

19. Decoder apparatus comprising:
means for receiving superblocks of compressed video data, said superblocks containing individual blocks each compressed using one of a plurality of compression modes;

means coupled to said receiving means for retrieving, from each received superblock, one of:
first overhead data indicative of a first compression mode used to compress the whole received superblock,
second overhead data indicative of a second compression mode used to compress the whole received superblock, and
third overhead data indicating that the individual blocks contained in the received superblock were compressed using a plurality of different compression modes;

means responsive to said first overhead data for decoding the received superblock using a decompression mode corresponding to said first compression mode;

means responsive to said second overhead data for decoding the received superblock using a decompression mode corresponding to said second compression mode; and means responsive to said third overhead data for identifying the compression mode used to compress each individual block in the received superblock and for decoding the received superblock using a decompression mode for each of said individual blocks that corresponds to the compression mode used to compress the block.

20. A decoder in accordance with claim 19 wherein:
a first one of said compression modes compresses said superblocks without motion compensation;
a second one of said compression modes compresses each of said individual blocks in a superblock with motion compensation based on a general motion vector for said superblock; and
a third one of said compression modes compresses each of said individual blocks in a superblock with motion compensation based on a specific motion vector for each of said individual blocks.

* * * * *